(12) United States Patent
Kim et al.

(10) Patent No.: US 8,630,202 B2
(45) Date of Patent: Jan. 14, 2014

(54) METHOD AND APPARATUS FOR CONTROLLING BUFFER STATUS REPORT MESSAGING

(75) Inventors: Bong Ho Kim, Morganville, NJ (US); Calin Doru, Manalapan, NJ (US)

(73) Assignee: Alcatel Lucent, Paris (FR)

( * ) Notice: Subject to any disclaimer, the term of this patent is extended or adjusted under 35 U.S.C. 154(b) by 152 days.

(21) Appl. No.: 13/250,124

(22) Filed: Sep. 30, 2011

(65) Prior Publication Data

US 2013/0083677 A1  Apr. 4, 2013

(51) Int. Cl.
*H04W 24/00* (2009.01)

(52) U.S. Cl.
USPC .................. 370/252; 370/236; 370/412

(58) Field of Classification Search
USPC .................. 370/252, 236, 412, 428, 429
See application file for complete search history.

(56) References Cited

U.S. PATENT DOCUMENTS

| | | | | |
|---|---|---|---|---|
| 2010/0202420 A1* | 8/2010 | Jersenius et al. | ............. | 370/337 |
| 2011/0019756 A1* | 1/2011 | Chun et al. | ..................... | 375/260 |
| 2011/0287738 A1* | 11/2011 | Peisa et al. | ..................... | 455/405 |
| 2012/0100864 A1* | 4/2012 | Susitaival et al. | ............. | 455/450 |
| 2013/0028201 A1* | 1/2013 | Koo et al. | ..................... | 370/329 |

OTHER PUBLICATIONS

Motorola: "BSR triggering", 3GPP Draft; R2-084426 BSR Triggering_V01, 3rd Generation Partnership Project (3GPP), Mobile Competence Centre; 650, Route Des Lucioles; F-06921 Sophia-Antipolis Cedex; France, No. Jeju; Aug. 12, 2008, XP050319491—4 pages.
"3rd Generation Partnership Project; Technical Specification Group Radio Access Network; Evolved Universal Terrestrial Radio Access (E-UTRA); Medium Access Control (MAC) protocol specification (Release 10)", 3GPP Standard; 3GPP TS 36.321, 3RD Generation Partnership Project (3GPP), Mobile Competence Centre; 650, Route Des Lucioles; F-06921 Sophia-Antipolis Cedex; France, vol. RAN WG2, No. V10.2.0, Jun. 21, 2011, pp. 1-54 XP050553468.
NEC: "Resource allocations in target cell after Handover": 3GPP Draft; R2-074276, 3rd Generation Partnership Project (3GPP), Mobile Competence Centre; 650, Route Des Lucioles; F-06921 Sophia-Antipolis Cedex; France, vol. RAN WG2, No. Shanghai, China; Oct. 1, 2007, XP050136883—5 pages.
International Search Report—Filing Date: Aug. 14, 2012—Date of Mailing: Nov. 30, 2012—3 pages.

* cited by examiner

*Primary Examiner* — Brian D Nguyen
(74) *Attorney, Agent, or Firm* — D. M. LaBruno

(57) ABSTRACT

An apparatus such as a user equipment user device, smart phone and the like includes a memory device and an associated processor configured to transmit a buffer status report message when a reported buffer size in a last transmitted buffer status report message is satisfied. The apparatus may be configured to store the reported buffer size associated with the last transmitted buffer status report message, and track one or more grants of uplink resource; wherein the reported buffer size associated with the last transmitted buffer status report message is satisfied based on the grants of uplink resource.

20 Claims, 9 Drawing Sheets

METHOD AND APPARATUS FOR CONTROLLING BUFFER STATUS REPORT MESSAGING

FIELD

This invention relates generally to communication networks and, more specifically but not exclusively, to management of the buffer status report messaging in wireless communication networks.

BACKGROUND

Fourth Generation (4G) wireless networks support large numbers of wireless subscribers running one or more applications wherein traffic is packetized and transported via IP networks according to multiple network elements utilizing different transport technologies and applied quality-of-service (QoS) policies. Contemporary wireless communication systems are designed to carry out several types of traffic types as generated by several applications. The applications may have very different (and even conflicting) QoS requirements. For instance, some applications, such as Machine-to-Machine or Instant Messages generate "thin" traffic, which places quite low demand on the user plane, but may be very bursty and have a significant impact on the control plane. On the other hand, some applications, such as video based applications, are less stressful on the control plane but may be very bandwith intensive on the user plane and subject to time critical constraints.

For example, Long Term Evolution (LTE) networks have the capability to deal with such applications having varied and/or conflicting QoS requirements. FIG. 1 depicts an exemplary wireless communication system including a LTE network. Specifically, FIG. 1 depicts an exemplary wireless communication system 100 that includes a plurality of User Equipments (UEs) or User Devices (UDs) 102, a Long Term Evolution (LTE) network 110, non-LTE access networks 120, IP networks 130, and a management system (MS) 140. The LTE network 110 supports communications between the UEs 102 and IP networks 130. The non-LTE access networks 120 interface with LTE network 110 for enabling UEs associated with non-LTE access networks 120 to utilize the LTE network 110 to access IP networks 130. The MS 140 is configured for supporting various management functions for LTE network 110.

The UEs 102 are wireless user devices capable of accessing a wireless network, such as LTE network 110. The UEs 102 are capable of supporting one or more bearer sessions to IP networks 130 via LTE network 110. The UEs 102 are capable of supporting control signaling in support of the bearer session(s). The UEs 102 each may have one or more identifiers associated therewith. For example, a UE 102 may have one or more of an International Mobile Subscriber Identity (IMSI), an International Mobile Equipment Identity (IMEI), and like identifiers or identities associated therewith. For example, each of the UEs 102 may be a phone, PDA, computer, or any other wireless user device. Multiple UDs are typically active at all times for each eNodeB (eNB).

The illustrated LTE network 110 is an exemplary LTE network. The configuration and operation of LTE networks will be understood by one skilled in the art. However, for purposes of completeness, a description of general features of LTE networks is provided herein within the context of exemplary wireless communication system 100.

The LTE network 110 includes two eNodeBs $111_1$ and $111_2$ (collectively, eNodeBs 111), two Serving Gateways (SGWs) $112_1$ and $112_2$ (collectively, SGWs 112), a Packet Data Network (PDN) Gateway (PGW) 113, two Mobility Management Entities (MMEs) $114_1$ and $114_2$ (collectively, MMEs 114), and a Policy and Charging Rules Function (PCRF) 115. The eNodeBs 111 provide a radio access interface for UEs 102. The SGWs 112, PGW 113, MMEs 114, and PCRF 115, as well as other components which have been omitted for purposes of clarity, cooperate to provide an Evolved Packet Core (EPC) network supporting end-to-end service delivery using IP.

The eNodeBs 111 support communications for UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102. The eNodeBs 111 may support any functions suitable for being supported by an eNodeB, such as providing an LTE air interface for the UEs 102, performing radio resource management, facilitating communications between UEs 102 and SGWs 112, maintaining mappings between the LTE-Uu interfaces and S1-u interfaces supported between the eNodeBs 111 and the SGWs 112, and the like, as well as combinations thereof.

The SGWs 112 support communications for eNodeBs 111. As depicted in FIG. 1, SGW $112_1$ supports communications for eNodeB $111_1$ and SGW $112_2$ supports communications for eNodeB $111_2$. The communication between the SGWs 112 and the eNodeBs 111 is supported using respective S1-u interfaces for example. The S1-u interfaces support per-bearer user plane tunneling and inter-eNodeB path switching during handover. The S1-u interfaces may use any suitable protocol, e.g., the GPRS Tunneling Protocol-User Plane (GTP-U). The SGWs 112 may support any functions suitable for being supported by an SGW, such as routing and forwarding user data packets (e.g., facilitating communications between eNodeBs 111 and PGW 113, maintaining mappings between the S1-u interfaces and S5/S8 interfaces supported between the SGWs 112 and PGWs 113, and the like), functioning as a mobility anchor for UEs during inter-eNodeB handovers, functioning as a mobility anchor between LTE and other 3GPP technologies, and the like, as well as combinations thereof.

The PGW 113 supports communications for the SGWs 112. The communication between PGW 113 and SGWs 112 is supported using respective S5/S8 interfaces. The S5 interfaces provide functions such as user plane tunneling and tunnel management for communications between PGW 113 and SGWs 112, SGW relocation due to UE mobility, and the like. The S8 interfaces, which are Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The S5/S8 interfaces may utilize any suitable protocol (e.g., the GPRS Tunneling Protocol (GTP), Mobile Proxy IP (MPIP), and the like, as well as combinations thereof). The PGW 113 facilitates communications between LTE network 110 and IP networks 130 via an SGi interface. The PGW 113 may support any functions suitable for being supported by an PGW, such as providing packet filtering, providing policy enforcement, functioning as a mobility anchor between 3GPP and non-3GPP technologies, and the like, as well as combinations thereof.

The MMEs 114 provide mobility management functions in support of mobility of UEs 102. The MMEs 114 support the eNodeBs 111. The MME $114_1$ supports eNodeB $111_1$ and the MME $114_2$ supports eNodeB $111_2$. The communication between MMEs 114 and eNodeBs 111 is supported using respective S1-MME interfaces, which provide control plane protocols for communication between the MMEs 114 and the eNodeBs 111. The S1-MME interfaces may use any suitable protocol or combination of protocol. For example, the S1-MME interfaces may use the Radio Access Network Application Part (eRANAP) protocol while using the Stream Control Transmission Protocol (SCTP) for transport. The MMEs 114 support the SGW 112. The MME 114$_1$ supports SGW 112$_1$ and the MME 114$_2$ supports SGW 112$_2$. The communication between MMEs 114 and SGWs 112 is supported using respective S11 interfaces. The MMEs 114$_1$ and 114$_2$ communicate using an S10 interface. The MMEs 114 may support any functions suitable for being supported by a MME, such selecting SGWs for UEs at time of initial attachment by the UEs and at time of intra-LTE handovers, providing idle-mode UE tracking and paging procedures, bearer activation/deactivation processes, providing support for Non-Access Stratum (NAS) signaling (e.g., terminating NAS signaling, ciphering/integrity protection for NAS signaling, and the like), lawful interception of signaling, and the like, as well as combinations thereof. The MMEs 114 also may communicate with a Home Subscriber Server (HSS) using an S6a interface for authenticating users (the HSS and the associated S6a interface are omitted for purposes of clarity).

The PCRF 115 provides dynamic management capabilities by which the service provider may manage rules related to services provided via LTE network 110 and rules related to charging for services provided via LTE network 110. For example, rules related to services provided via LTE network 110 may include rules for bearer control (e.g., controlling acceptance, rejection, and termination of bearers, controlling QoS for bearers, and the like), service flow control (e.g., controlling acceptance, rejection, and termination of service flows, controlling QoS for service flows, and the like), and the like, as well as combinations thereof. For example, rules related to charging for services provided via LTE network 110 may include rules related to online charging (e.g., time-based charging, volume-based charging, event-based charging, and the like, which may depend on factors such as the type of service for which charging is being provided), offline charging (e.g., such as for checking subscriber balances before services are provided and other associated functions), and the like, as well as combinations thereof. The PCRF 115 communicates with PGW 113 using a S7 interface. The S7 interface supports transfer of rules from PCRF 115 to a Policy and Charging Enforcement Function (PCEF) supported by PGW 113, which provides enforcement of the policy and charging rules specified on PCRF 115.

As depicted in FIG. 1, elements of LTE network 110 communicate via interfaces between the elements. The interfaces described with respect to LTE network 110 also may be referred to as sessions. For example, the communication between eNodeBs and SGWs is provided via S1-u sessions, communication between SGWs and PGWs is provided via S5/S8 sessions, and so forth, as depicted in FIG. 1 and described herein. The sessions of LTE network 110 may be referred to more generally as S* sessions. It will be appreciated that each session S* that is depicted in FIG. 1 represents a communication path between the respective network elements connected by the session and, thus, that any suitable underlying communication capabilities may be used to support the session S* between the network elements. For example, a session S* may be supported using anything from direct hardwired connections to full network connectivity (e.g., where the session S* is transported via one or more networks utilizing nodes, links, protocols, and any other communications capabilities for supporting the communication path) and anything in between, or any other suitable communications capabilities.

For example, an S1-u session between an eNodeB 111 and an SGW 112 may be supported using an Internet Protocol (IP)/Multiprotocol Label Switching (MPLS) transport capability including mobile backhaul elements associated with the eNodeB 111 (e.g., using service aware routers (SARs), service access switches (SAS), and the like) and mobile backhaul elements associated with the SGW 112 (e.g., multi-service edge routers and/or other similar elements), as well as an IP/MPLS aggregation network facilitating communications between the mobile backhaul elements associated with the eNodeB 111 and the mobile backhaul elements associated with the SGW 112). Similarly, an S1-u session between an eNodeB 111 and an SGW 112 may be supported using an IP routing network using a routing protocol (e.g., Open Shortest Path First (OSPF), Intermediate System to Intermediate System (ISIS) and the like). The types of underlying communications capabilities which may be utilized to support each of the different types of sessions of LTE network 110 will be understood by one skilled in the art.

The LTE network 110 supports access to IP networks 130 from non-LTE networks 120. The non-LTE networks 120 with which the LTE network 110 may interface include 3GPP access networks 121. The 3GPP access networks 121 may include any 3GPP access networks suitable for interfacing with LTE network 110 (e.g., 2.5G networks, 3G networks, 3.5G networks, and the like). For example, the 3GPP access networks 121 may include Global System for Mobile (GSM) Enhanced Data Rates for GSM Evolution (EDGE) Radio Access Networks (GERANs), Universal Mobile Telecommunications System (UMTS) Terrestrial Radio Access Networks (UTRANs), or any other 3GPP access networks suitable for interfacing with LTE, and the like, as well as combinations thereof.

The LTE network 110 interfaces with 3GPP access networks 121 via a Serving General Packet Radio Service (GPRS) Support Node (SGSN) 122. The MME 114$_2$ supports control plane functionality for mobility between LTE network 110 and 3GPP access networks 121 using communication with SGSN 122 via an S3 interface. For example, the S3 interface enables user and bearer information exchange for 3GPP network access mobility in idle and/or active state. The SGW 112$_2$ supports user plane functionality for mobility between LTE network 110 and 3GPP access networks 121 using communication with SGSN 122 via an S4 interface. For example, the S4 interface provides the user plane with related control and mobility support between SGSN 122 and SGW 112$_2$.

The non-LTE networks with which the LTE network may interface include non-3GPP access networks 125. The non-3GPP access networks 125 may include any non-3GPP access networks suitable for interfacing with LTE network 110. For example, the non-3GPP access networks may include 3GPP2 access networks (e.g., Code Division Multiple Access 2000 (CDMA 2000) networks and other 3GPP2 access networks), Wireless Local Area Networks (WLANs), and the like). The support for mobility between the LTE network 110 and the non-3GPP access networks 125 may be provided using any suitable interface(s), such as one or more of the S2a interface, the S2b interface, the S2c interface, and the like, as well as combinations thereof. The S2a interface provides control and mobility support to the user plane for trusted non-3GPP access to the LTE network. The S2a interface may provide access for trusted non-3GPP networks using any suitable protocol(s), such as MPIP, Client Mobile IPv4 Foreign Agent (FA) mode (e.g., for trusted non-3GPP access that does not support MPIP), and the like, as well as combinations thereof. The S2b interface provides control and mobility support to the user plane for non-trusted non-3GPP access to the LTE network. The S2b interface may be provided an interface between PGW 113 and an evolved Packet Data Gateway (ePDG) associated with the non-trusted non-3GPP access network. The S2b interface may use any suitable protocol, such as MPIP or any other suitable protocols. The S2c interface provides control and mobility support to the user plane for providing UEs access to PGW 113 via trusted and/or non-trusted 3GPP access using one or more protocols based on Client Mobile IP co-located mode.

The LTE network 110 includes an Evolved Packet System/Solution (EPS). In one embodiment, the EPS includes EPS nodes (e.g., eNodeBs 111, SGWs 112, PGW 113, MMEs 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UEs 102 may access content, services, and the like. For example, the IP networks 130 include an IP Core network and, optionally, one or more other IP networks (e.g., IP Multimedia Subsystem (IMS) networks and the like). The IP networks 130 support bearer and control functions in support of services provided to UEs 102 via LTE network 110. The IP Core network is capable of providing any functions which may be provided by such a core network. The IP Core network is a packet data network via which UEs 102 may access content, services, and the like. The IMS network is capable of providing any functions which may be provided by an IMS network.

The MS 140 provides management functions for managing the LTE network 110. Management functions of the MS may include discovery (discovery of information about the LTE networks such as configuration information, status/operating information, and connection information which is stored in a discovery database), correlation (correlation of discovered network elements to specific customer traffic flows supporting customer services which information is stored in a paths database), analysis of network information, auditing, trace for providing trace functionality, and fairness management for providing enforcement functionality.

The MS 140 may communicate with LTE network 110 in any suitable manner. In one embodiment, for example, MS 140 may communicate with LTE network 110 via a communication path 141 which does not traverse IP network networks 130. In one embodiment, for example, MS 140 may communicate with LTE network 110 via a communication path 142 which then passes via IP networks 130. The communication paths 141 and 142 may be implemented using any suitable communications capabilities.

The MS 140 is adapted to receive information from LTE network 110 (e.g., discovery information adapted for use in determining the topology of LTE network, results of test initiated by MS 140 to LTE network 110, and the like, as well as any other information which may be received by MS 140 from LTE network 110 in support of the management functions performed by MS 140). Similarly, for example, MS 140 is adapted to transmit information to LTE network 110 (e.g., discovery requests for discovering information adapted for use by MS 140 in determining the topology of LTE network, audits request for auditing portions of LTE network 110, and the like, as well as any other information which may be transmitted by MS 140 to LTE network 110 in support of the management functions performed by MS 140).

In dealing with applications, a conventional LTE network makes use of Buffer Status Report (BSR) messages. The Buffer Status reporting procedure is used to provide the serving eNB with information about the amount of data available for transmission in the UpLink (UL) buffers of the UE. Radio Resource Control (RRC) controls BSR reporting by configuring two timers, a periodic BSR timer (e.g., "periodicBSR-Timer") which indicates the periodic timing of a BSR message and a retransmit BSR timer (e.g., "retxBSR-Timer") which indicates a retransmission wait period for retransmission of a BSR message upon transmission of the BSR message. Optionally, the RRC may also signal, for each logical channel, a logical channel group indicator (e.g., "logicalChannelGroup") which allocates the logical channel to a Logical Channel Group (LCG). For the Buffer Status reporting procedure, the UE considers all radio bearers which are not suspended and may consider radio bearers which are suspended. In conjunction with such BSR messaging, the network attempts to provide a desired level of Quality of Service (QoS).

FIG. 2 represents an example flowchart illustrating the default LTE protocol 200 for sending Buffer Status Report (BSR) messages from a User Equipment (UE). At step 210, the UE is known to have an empty buffer. An empty buffer indicates that there is no data available for transmission in the UpLink (UL) buffers of the UE. At step 212, after packet arrival from the upper layer (i.e., application layer), the UE sends a regular BSR message which indicates the total buffer size to an eNB. The UE also starts the periodic BSR timer and starts the retransmit BSR timer. The UE then proceeds to wait for a grant message at step 214.

While waiting for the grant, if the retransmit BSR timer times out before receipt of the grant, the UE loops back to step 212 and again sends a regular BSR message, and restarts the periodic BSR timer and the retransmit BSR timer. Thus, the illustrated procedure will wait for a grant message for up to a period of time equivalent to the value of the retransmit BSR timer before resending a regular BSR message.

While waiting for the grant, if the grant is received before the retransmit BSR timer times out, the UE proceeds to step 216 where it is determined whether the buffer size is greater than the grant size. That is; it is determined whether the amount of data available for transmission in the UL buffers of the UE is larger than the grant size.

If the buffer size is not greater than the grant size, at step 218 the UE transmits data with the data size equal to the buffer size, and terminates the periodic BSR timer and the retransmit BSR timer. That is, the UE will transmit all data remaining in the UL buffers and end BSR timing. After these activities, the UE loops back to step 210 at which point the buffer is once again known to be empty.

If the buffer size is greater than the grant size, the UE determines whether the periodic BSR timer has expired at step 220. The value of the periodic BSR timer indicates a period of time to wait between transmissions of BSR messages. If the periodic BSR timer has not expired, the UE transmits a data message with data size equivalent to the grant size at step 222 and then returns to step 214 to await another grant so as to be permitted to transmit additional portion(s) of the data remaining in the UL buffers at the UE. If the periodic BSR timer has expired, at step 224, the UE prepares a periodic BSR message to report the buffer size as the buffer size minus the difference of the grant size minus the BSR message size, transmits a data message with data equivalent to the grant size minus the BSR message size, and restarts the periodic BSR timer and the retransmit BSR timer. Thus, after receiving a grant that is not larger than the buffer size (i.e., amount of data available for transmission in the UL buffer(s) of the UE) and expiration of the periodic BSR timer, the illustrated procedure sends a periodic BSR message and a portion of the data in the UL buffer(s) of the UE. The UE then returns to step 214 to await a grant to be able to transmit additional portion(s) of the data remaining in the UL buffers at the UE.

Additional description for the BSR is found in the 3GPP document TS 36.321 and the potential values for periodic BST timer (e.g., "periodicBSR-Timer") and retransmit BSR timer (e.g., "retxBSR-Timer") are provided in the RRC document, namely 3GPP TS 36.331 both of which are known to those skilled in the art of the invention and herein incorporated by reference. MAC-MainConfig topic of section 6.3.2 in 3GPP TS 36.331 lists those values for both timers. Some default values are suggested in section 9.2.2 of the same document. The periodic BSR timer "periodicBSR-Timer" (default=infinity) is optional and the values are sf5, sf10, sf16, sf20, sf32, sf40, sf64, sf80, sf128, sf160, sf320, sf640, sf1280, sf2560, infinity and spare1 ("sf5" means subframe 5 and it is equivalent to 5 msec; "sf10" means subframe 10 and it is equivalent to 10 msec, etc.). The retransmit BSR timer "retxBSR-Timer" (default=sf2560) values are sf320, sf640, sf1280, sf2560, sf5120, sf10240, spare2 and spare1.

FIG. 3 is an example communication flow illustrating UE-eNB packet transmissions according to the protocol for sending BSR messages detailed in FIG. 2. In the illustrated example of FIG. 3, the periodic BSR timer is set to five (5) subframes and the retransmit BSR timer is set two-thousand five-hundred sixty (2560) subframes. Time, denoted by times instances numbered T99, T100, . . . T113 runs from the top to bottom of FIG. 3. While both periodic BSR timer and the retransmit BSR timer are utilized, activity associated with the expiration of the retransmit BSR timer is not in action/invoked in the illustrated example of FIG. 3.

At time T99, fifteen hundred (1500) bytes are placed in the UL buffer/s of the UE. At time T100, a regular BSR message is transmitted from the UE to the eNB. The BSR message is characterized as regular since it is the initial BSR message. The BSR message indicates that there are fifteen hundred (1500) bytes are in the buffer of the UE (i.e., fifteen hundred (1500) bytes available for transmission in the UL buffers of the UE). At time T101, an additional three hundred (300) bytes are placed in the UL buffers of the UE. At time T102, the eNB transmits a first grant message to the UE; the UE receives from the eNB the first grant for five hundred (500) bytes. The buffer size being greater than the grant size and the periodic BSR timer not yet having expired (FIG. 2: 216, 220), at time T103, the UE transmits a first data message of five hundred (500) bytes (FIG. 2: 222). At time T105, while waiting for the next grant (FIG. 2: 214), the periodic BSR timer has expired and the UE is ready to prepare a periodic BSR message (P_BSR). The periodic timer expires on T105 since the timer value is 5 subframes/5 ms.

At time T106, the UE receives from the eNB a second grant for five hundred (500) bytes. Buffer size is now thirteen hundred bytes (1500 at start+300 added−500 transmitted=1300). The buffer size being greater than the grant size and the periodic BSR timer having expired (FIG. 2: 216, 220), at time T107, the UE prepares and transmits a periodic BSR message data message and a second data message (FIG. 2: 224). The periodic BSR message transmitted reports the buffer size as eight hundred ten (810) bytes, which is the buffer size (1300 bytes) minus the difference of the grant size (500 bytes) minus the BSR message size (e.g., 10 bytes). The transmitted data message has a data size equal to four hundred ninety (490) bytes, which is a size equivalent to the grant size (500 bytes) minus the BSR message size (e.g., 10 bytes).

At time T108, the eNB transmits a third grant to the UE; the UE receives from the eNB the third grant for eight hundred ten (810) bytes. The buffer size not being greater than the grant size (FIG. 2: 216), at time T110, the UE transmits a third data message with a data size equivalent to the grant of eight hundred ten (810) (FIG. 2: 218). The UL buffers of the UE are now empty and the illustrative example ends.

SUMMARY

Apparatus and methodology are provided for transmitting a BSR message as soon as the reported buffer size in the last BSR message is satisfied. The methodology involves tracking the total grant size since the last BSR transmission. In this manner, the embodiments provided are able to respond to the specific needs of applications and, as such, packet access delay and jitter will be reduced regardless of application type.

In one embodiment, an apparatus includes a memory device and an associated processor with the processor configured to transmit a buffer status report message when a reported buffer size in a last transmitted buffer status report message is satisfied. In one embodiment, the processor of the apparatus is configured to store the reported buffer size associated with the last transmitted buffer status report message, and track one or more grants of uplink resource; wherein the reported buffer size associated with the last transmitted buffer status report message is satisfied based on the grants of uplink resource. In one embodiment, the processor of the apparatus may be configured to transmit the last transmitted buffer status report message.

In another embodiment, the processor of the apparatus is configured to receive one or more grant messages, the one or more grant messages each indicating a corresponding grant size of the uplink resource; and accumulate a total grant size based on the corresponding grant size of the one or more grant messages. In one embodiment, the processor of the apparatus is configured to determine that the reported buffer size associated with the last transmitted buffer status report message is satisfied if the total grant size is greater than or equal to the reported buffer size associated with the last transmitted buffer status report message. In another embodiment, the processor of the apparatus is configured to determine that the reported buffer size associated with the last transmitted buffer status report message is satisfied when buffer size is greater than grant size of a first of the one or more grants of uplink resource, a periodic buffer status report timer has not expired, and a total grant size of the one or more grants of uplink resource is greater than or equal to the reported buffer size associated with the last transmitted buffer status report message.

The apparatus may be a user equipment, user device, smart phone, mobile station and the like. In one embodiment, the processor of the apparatus may be configured to transmit a data message in response to the one or more grants of uplink resource. In a further embodiment, the processor of the apparatus is configured to adjust a size of the data message to account for transmission of the buffer status report message within a same grant of uplink resource In one embodiment, the processor of the apparatus is configured to transmit another buffer status report message periodically. In another embodiment, the processor of the apparatus is configured to transmit another buffer status report message in response to the one or more grants of uplink resource after expiry of a periodic timer.

An example method embodiment includes storing a reported buffer size associated with a last transmitted buffer status report message, tracking one or more grants of uplink resource, and transmitting a buffer status report message when the reported buffer size associated with the last transmitted buffer status report message is satisfied based on the one or more grants of uplink resource.

In one embodiment, the method further includes transmitting the last transmitted buffer status report message. In another embodiment, tracking one or more grants of uplink resource includes receiving one or more grant messages, the one or more grant messages each indicating a corresponding grant size of the uplink resource, and accumulating a total grant size based on the corresponding grant size of the one or more grant messages.

In one embodiment, the method includes determining the reported buffer size associated with the last transmitted buffer status report message is satisfied if the total grant size is greater than or equal to the reported buffer size associated with the last transmitted buffer status report message. In one embodiment, the method includes determining if the reported buffer size associated with the last transmitted buffer status report message is satisfied when buffer size is greater than grant size of a first of the one or more grants of uplink resource, a periodic buffer status report timer has not expired and a total grant size of the one or more grants of uplink resource is greater than or equal to the reported buffer size associated with the last transmitted buffer status report message.

The method may be performed by a user equipment, user device, smart phone, mobile station and the like. In one embodiment, the method includes transmitting a data message in response to the one or more grants of uplink resource. Transmitting the data message may include transmitting the data message with a size of the data message adjusted to account for the transmitting of the buffer status report message within a same grant of uplink resource in another embodiment.

In one embodiment, the method includes transmitting another buffer status report message periodically. A further embodiment includes transmitting another buffer status report message in response to the grants of uplink resource after expiry of a periodic timer.

BRIEF DESCRIPTION OF THE DRAWINGS

Example embodiments will be more clearly understood from the following detailed description taken in conjunction with the accompanying drawings. The Figures represent non-limiting, example embodiments as described herein.

To facilitate understanding, identical reference numerals have been used, where possible, to designate identical elements that are common to the figures.

DETAILED DESCRIPTION

Figure 1:
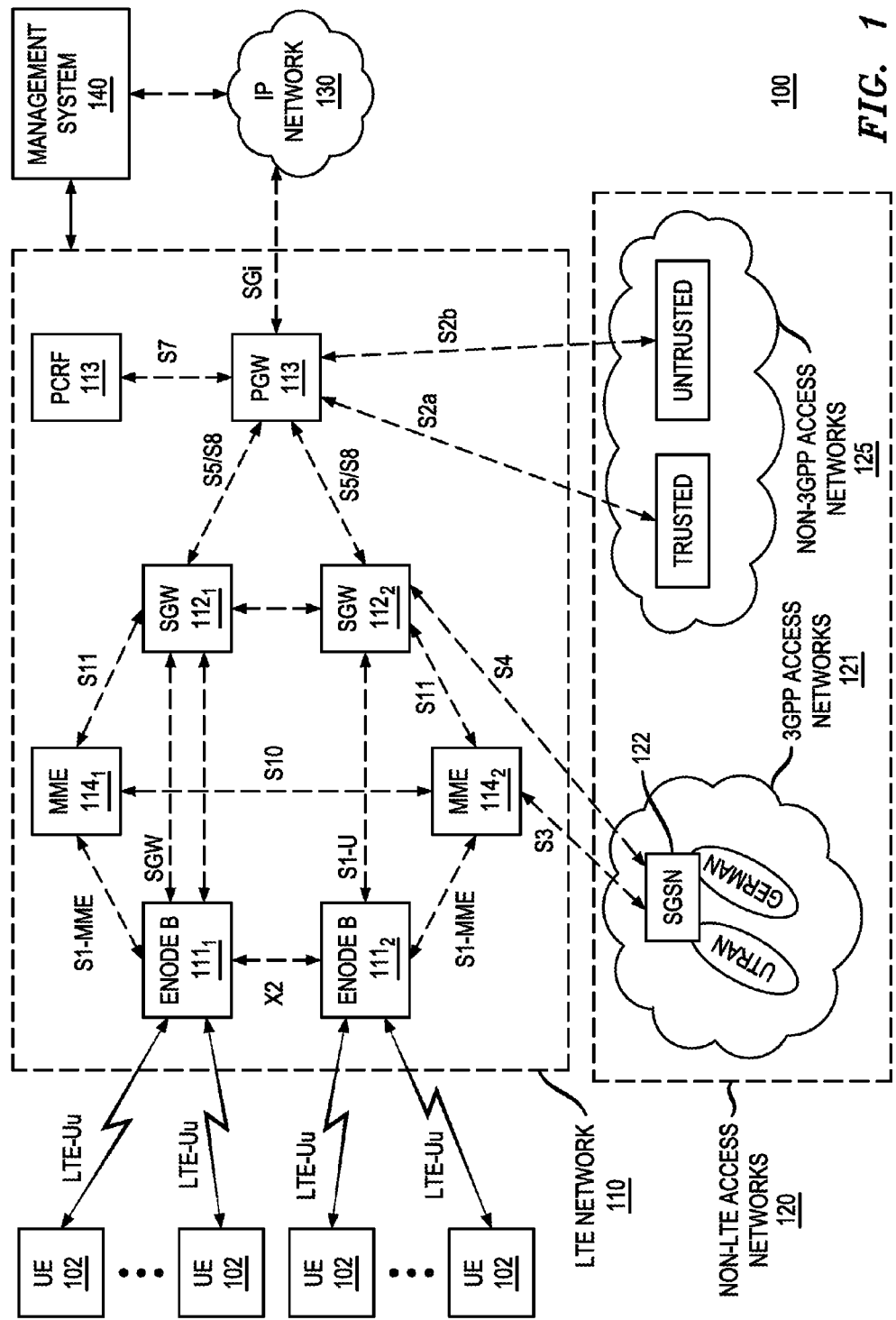
FIG. 1 depicts an exemplary wireless communication system including a LTE network.

Various example embodiments will now be described more fully with reference to the accompanying drawings in which some example embodiments are illustrated. Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. References to 'one embodiment' or 'an embodiment' need not necessarily refer to a single embodiment; that is an embodiment need not include all features referring to as being in 'an embodiment.' As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a cell site, base station or Node B, a user equipment device). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments may be encoded on some form of tangible (or recording) storage medium. The tangible storage medium may be magnetic (e.g., a floppy disk or a hard drive) or optical (e.g., a compact disk read only memory, or "CD ROM"), and may be read only or random access. Example embodiments are not limited by these aspects of any given implementation.

As used herein, the term "user equipment" (UE) may be synonymous to user equipment, user device, user equipment device, a mobile user, mobile station, mobile terminal, user, subscriber, smart phone, wireless terminal and/or remote station and may describe a remote user of wireless resources in a wireless communication network.

When utilizing BSR messaging according to LTE standards, performance degradation may occur when the periodic BSR timer has not expired yet but the total granted size is equal to or more than the reported size in the last sent BSR message. In such cases, it is very possible to encounter scenarios where the UE (e.g., the LTE terminal) buffer keeps increasing due to new packets created by applications on the UE (e.g., video, picture, document, etc.) but, the UE is not be able to send another BSR message until the BSR retransmission timer expires. As a result, the eNB (this is the LTE Base Station) does not have any knowledge of the UE buffer conditions and does not allocate any resources until it receives a new BSR request. Eventually, resources will be allocated after the BSR retransmission timer expires and a BSR message is forwarded by the UE to the eNB. However, the delay until expiration of the BSR retransmission timer may result in increased access delay and jitter beyond what can be tolerated per application. For instance, the VoIP packet can only tolerate a delay budget which is typically 200 ms to 250 ms end-to-end; beyond this delay threshold VoIP packets may be dropped resulting in a reduced quality of service or quality of experience.

Figure 2:
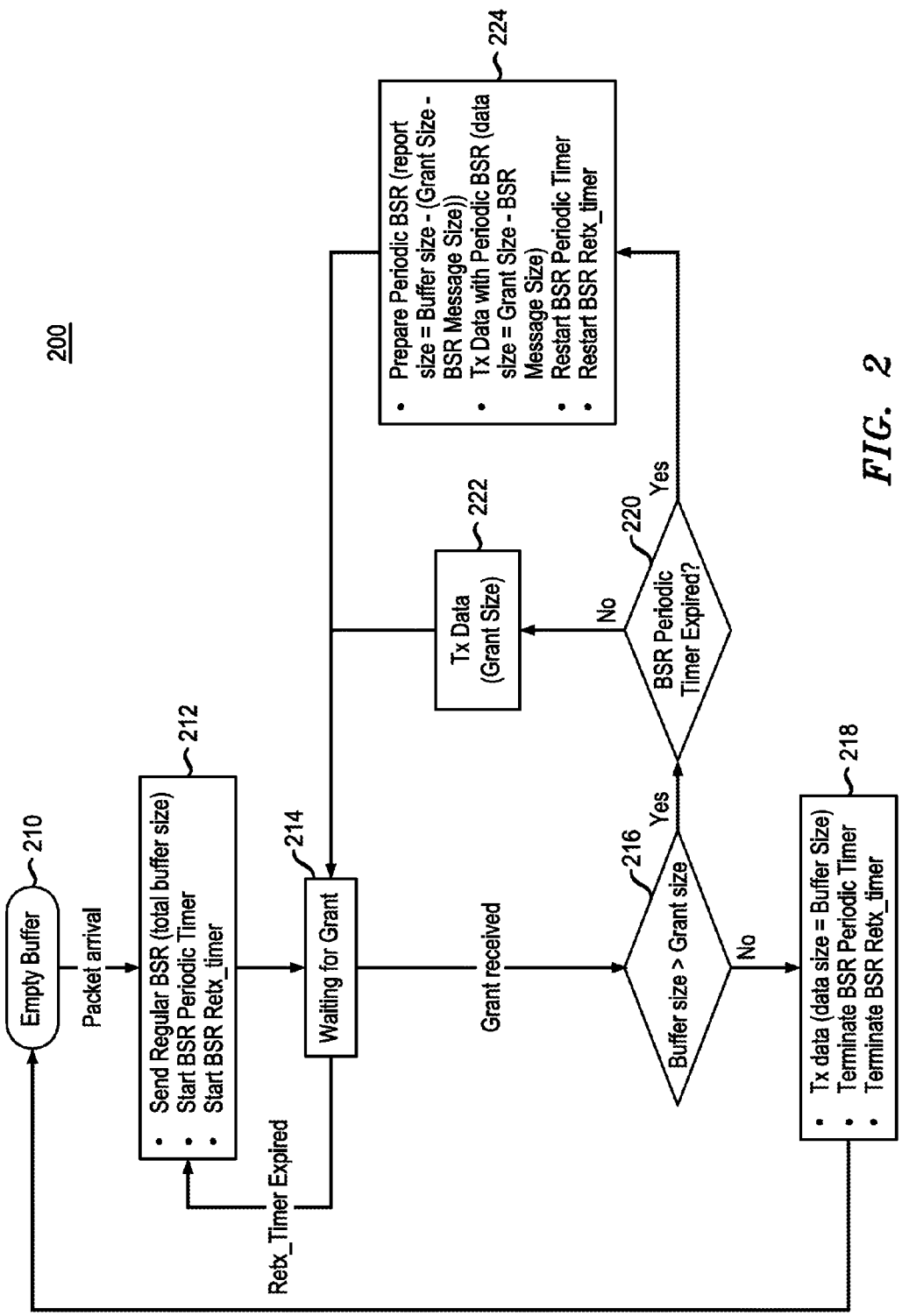
FIG. 2 represents an example flow chart illustrating the default LTE protocol for sending Buffer Status Report (BSR) messages.
Figure 3:
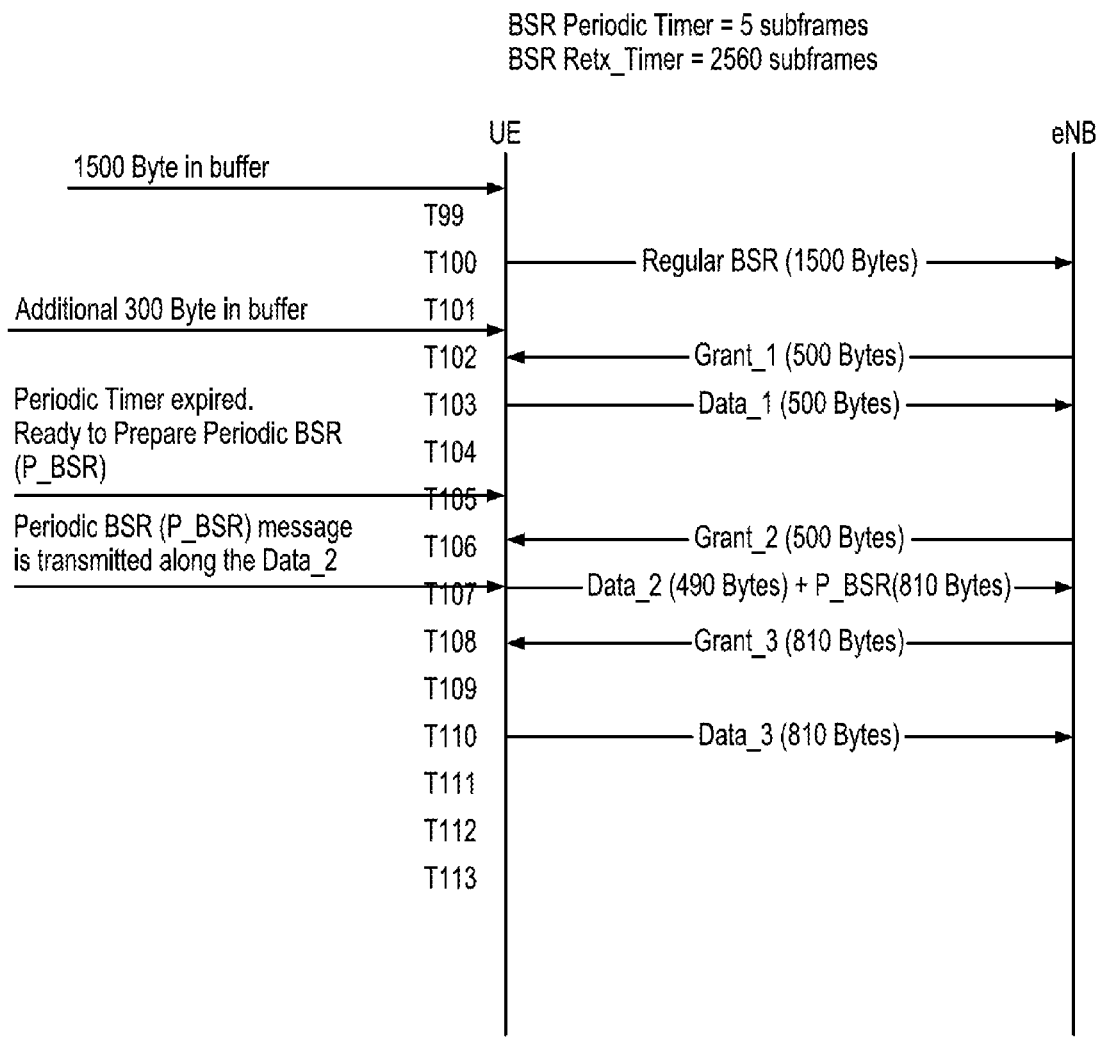
FIG. 3 is an example communication flow illustrating UE-eNB packet transmissions according to the protocol for sending BSR messages detailed in FIG. 2.
Figure 4:
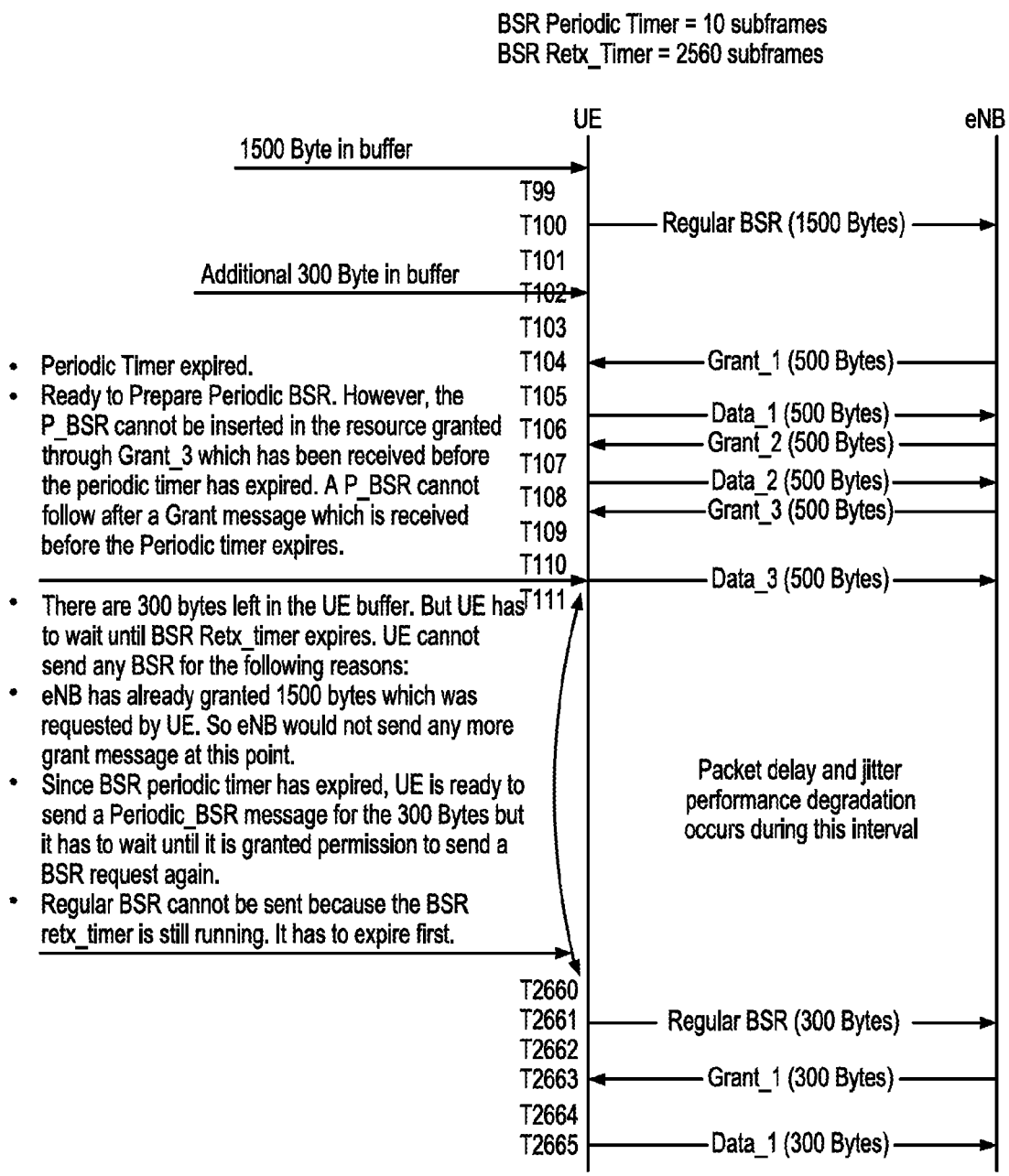
FIG. 4 is an example communication flow illustrating UE-eNB packet transmissions with packet delay performance degradation caused according to the default protocol for sending BSR messages detailed in FIG. 2.

FIG. 4 is an example communication flow illustrating UE-eNB packet transmissions with packet delay performance degradation caused according to the default protocol for sending BSR messages detailed in FIG. 2. In the illustrated example of FIG. 4, the periodic BSR timer is set to ten (10) subframes and the retransmit BSR timer is set two-thousand five-hundred sixty (2560) subframes. Time, denoted by times instances numbered T99, T100, . . . T2665 runs from the top to bottom of FIG. 4. While both periodic BSR timer and the retransmit BSR timer are utilized, activity associated with the expiration of the retransmit BSR timer is in action/invoked in the illustrated example.

Referring to FIG. 4, at time T99, fifteen hundred (1500) bytes are placed in the UL buffer/s of the UE. At time T100, a regular BSR message is transmitted from the UE to the eNB. The BSR message is characterized as regular since it is the initial BSR message. The BSR message indicates that there are fifteen hundred (1500) bytes in the buffer of the UE (i.e., fifteen hundred (1500) bytes available for transmission in the UL buffers of the UE). At time T102, an additional three hundred (300) bytes are placed in the UL buffers of the UE so that there are now eighteen hundred bytes (1800) available for transmission. At time T104, the eNB transmits a first grant to the UE; the UE receives from the eNB the first grant for five hundred (500) bytes. The buffer size being greater than the grant size and the periodic BSR timer not yet having expired (FIG. 2: 216, 220), at time T106, the UE transmits a first data message of five hundred (500) bytes (FIG. 2: 222).

At time T107, the eNB transmits a second grant to the UE; the UE receives from the eNB the second grant for five hundred (500) bytes. Once again, the buffer size being greater than the grant size and the periodic BSR timer not yet having expired (FIG. 2: 216, 220), at time T108, the UE transmits a second data message of five hundred (500) bytes (FIG. 2: 222).

At time T109, the eNB transmits a third grant to the UE; the UE receives from the eNB the third grant for five hundred (500) bytes. The buffer size being greater than the grant size and the periodic BSR timer not yet having expired (FIG. 2: 216, 220), at time T110, the UE transmits a third data message of five hundred (500) bytes. Thereafter, the periodic BSR timer expires and the UE is ready to prepare a periodic BSR message (P_BSR). At this time, three hundred (300) bytes remain in the UE buffer. However, the UE has to wait (FIG. 2: 214) until the retransmit BSR timer expires before transmitting any additional data. At this point, the UE can not send any BSR messages for the following reasons:

The eNB has already granted the fifteen hundred (1500) bytes requested by the UE; therefore, the eNB would not send any additional grant message(s) at this point in time;

While the periodic BSR timer has expired and the UE is ready to send a periodic BSR message for the remaining three hundred (300) bytes, the UE has to wait until it is granted permission to send a BSR message again;

A regular BSR message can not be sent because the retransmit BSR timer is still running and must first expire before a regular BSR message is sent.

During this interval until the retransmit BSR timer expires, packet delay and jitter performance degradation occur.

At time T2660, the retransmit BSR timer expires and accordingly, at time T2661 a regular BSR message is transmitted from the UE to the eNB to indicate that there are three hundred (300) bytes in the UL buffer(s) of the UE. At time T2663, the eNB transmits a first grant to the UE; the UE receives from the eNB the first grant for three hundred (300) bytes. The buffer size not being greater than the grant size (FIG. 2: 216), at time T2665, the UE transmits a first data message of three hundred (300) bytes (FIG. 2: 218). (Here in this example illustration, first, second, third denote the sequential number of the grant message or data message in relation to a corresponding regular BSR message.)

In addition, it is noted that a periodic BSR message (i.e., P_BSR) cannot be inserted in the resourse granted through the third grant which has been received before the periodic BSR timer has expired. A P_BSR can not follow after a grant message which is received before the periodic BSR timer expires. This is so because when the third grant is received, the Media Access Control (MAC) Protocol Data Unit (MPDU) packet is created for the transmission without considering insertion of periodic BSR message since the corresponding timer has not expired yet.

Figure 5:
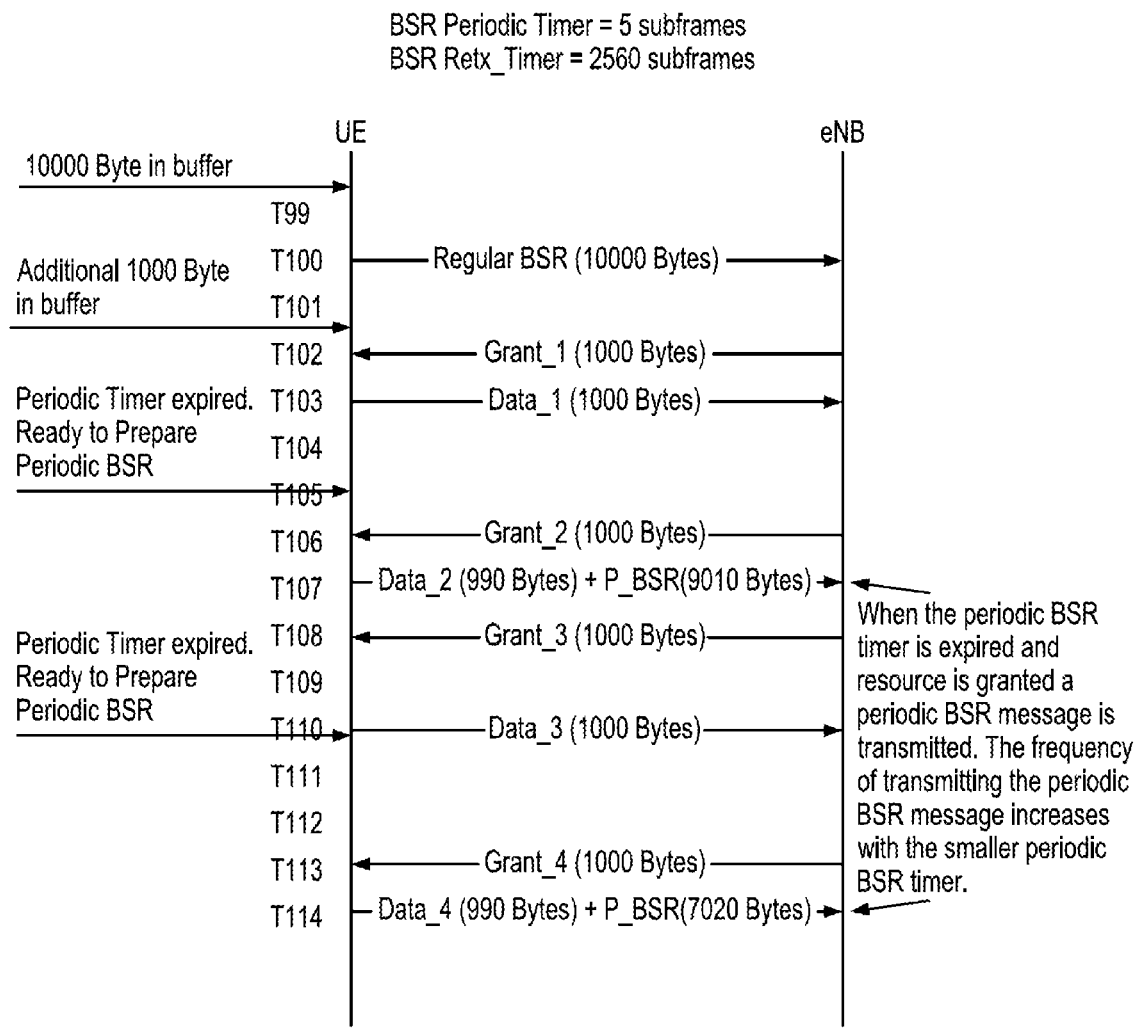
FIG. 5 is an example communication flow illustrating UE-eNB packet transmissions with signaling overhead increasing according to the default protocol for sending BSR messages detailed in FIG. 2.

A remedy for the above problem of packet delay performance degradation is to set the BSR transmission and BSR retransmission timers such that the packet delay problem is minimized. The periodic BSR timer (e.g., "periodicBSR-Timer") can be set to a very small value so that the UE will inform the network in a more timely manner regarding the UE's current status. This action would allow the network to be aware of the potential UE data backlog and to take appropriate actions when possible. However, a drawback of this small periodic BSR timer value solution is that with a small timer value, the UE will generate far many more periodic BSR transmit requests, which in turn will result in signaling overhead increase (as represented in FIG. 5). Since the control channels are the bottleneck for thin applications, increasing the signaling overhead further is not an acceptable solution.

FIG. 5 is an example communication flow illustrating UE-eNB packet transmissions with signaling overhead increasing according to the default protocol for sending BSR messages detailed in FIG. 2 when periodic BSR timer value is decreased. In the illustrated example of FIG. 5, the periodic BSR timer is set to five (5) subframes and the retransmit BSR timer is set two-thousand five-hundred sixty (2560) subframes. Time, denoted by times instances numbered T99, T100, ... T114 runs from the top to bottom of FIG. 5. While both periodic BSR timer and the retransmit BSR timer are utilized, activity associated with the expiration of the retransmit BSR timer is not in action/invoked in the illustrated example.

At time T99, ten thousand (10000) bytes are now in the buffer of the UE. At time T100, a regular BSR message is transmitted from the UE to the eNB. The BSR message is characterized as regular since it is the initial BSR message. The BSR message indicates that there are ten thousand (10000) bytes in the buffer of the UE (i.e., ten thousand (10000) bytes available for transmission in the UL buffer(s) of the UE). At time T101, an additional one thousand (1000) bytes are placed in the UL buffers of the UE so that there are now eleven thousand bytes (11000) available for transmission. At time T102, the eNB transmits a first grant to the UE; the UE receives from the eNB the first grant for one thousand (1000) bytes. The buffer size being greater than the grant size and the periodic BSR timer not yet having expired (FIG. 2: 216, 220), at time T106, the UE transmits a first data message of one thousand (1000) bytes (FIG. 2: 222).

At time T105, the periodic BSR timer expires and the UE is ready to prepare a periodic BSR message.

At time T106, the UE receives from the eNB a second grant for one thousand (1000) bytes. Buffer size is now ten thousand bytes (10000 initially+1000 added−1000 transmitted=10000). The buffer size being greater than the grant size and the periodic BSR timer having expired (FIG. 2: 216, 220), at time T107, the UE prepares and transmits a periodic BSR message and a second data message. The periodic BSR message transmitted reports the buffer size as nine thousand ten (9010) bytes, which is the buffer size (10000 bytes) minus the difference of the grant size (1000 bytes) minus the BSR message size (e.g. 10 bytes). The transmitted data message has a data size equal to nine hundred ninety (990) bytes, which is a size equivalent to the grant size (1000 bytes) minus the BSR message size (10 bytes).

At time T108, the eNB transmits a third grant to the UE; the UE receives from the eNB the third grant for one thousand (1000) bytes. The buffer size being greater than the grant size and the periodic BSR timer having expired (FIG. 2: 216, 220), at time T110, the UE transmits a third data message of one thousand (1000) bytes (FIG. 2: 222).

At time T110, periodic BSR timer has expired and so the UE is ready to prepare a periodic BSR message data message. At time T113, the UE receives from the eNB a fourth grant for one thousand (1000) bytes. Buffer size is now eight thousand ten bytes (9010 at last P_BSR−1000 transmitted=8010). The buffer size being greater than the grant size and the periodic BSR timer having expired (FIG. 2: 216, 220), at time T114, the UE prepares and transmits a periodic BSR message data message and a fourth data message. The periodic BSR message transmitted reports the buffer size as seven thousand twenty (7020) bytes, which is the buffer size (8010 bytes) minus the difference of the grant size (1000 bytes) minus the BSR message size (e.g. 10 bytes). The transmitted data message has a data size equal to nine hundred ninety (990) bytes, which is a size equivalent to the grant size (1000 bytes) minus the BSR message size (10 bytes).

Note that when the periodic BSR timer is expired and resource is granted, a periodic BSR message is transmitted. The frequency of transmitting the periodic BSR message increses with a smaller duration periodic BSR timer, resulting in increased signaling overhead. From comparision of FIGS. 4 and 5, the increase in signaling overhead may be visualized.

In addition to the signaling overhead increase, the remedy of decreasing periodic BSR timer length may still fail to overcome the packet delay and jitter performance degradation since the scenario described in FIG. 4 still may occur with the smallest periodic BSR timer (i.e., 5 msec) specified in 3GPP document (TS 36.331). Further, the retransmit BSR timer (e.g., "retxBSR-Timer") being set to the minimum value specified by 3GPP will not solve the problem either, as the inter-packet delay access can be still higher than 320 msec which is not acceptable for all applications. Moreover, choosing any set of timer values for the periodic BSR timer and the retransmit BSR timer (e.g., "periodicBSR-Timer"=value X and "retxBSR-Timer"=value Y) fails to optimize the access delay of all applications.

Apparatus and methodology are provided that escape from the waiting process (FIG. 2: 214) as soon as the reported buffer size in the last BSR message is satisfied. The methodology involves tracking the total grant size since the last BSR transmission. Accordingly, the provided methodology is able to respond to the specific needs of applications and, as such, packet access delay and jitter will be reduced regardless of application type.

Figure 6:
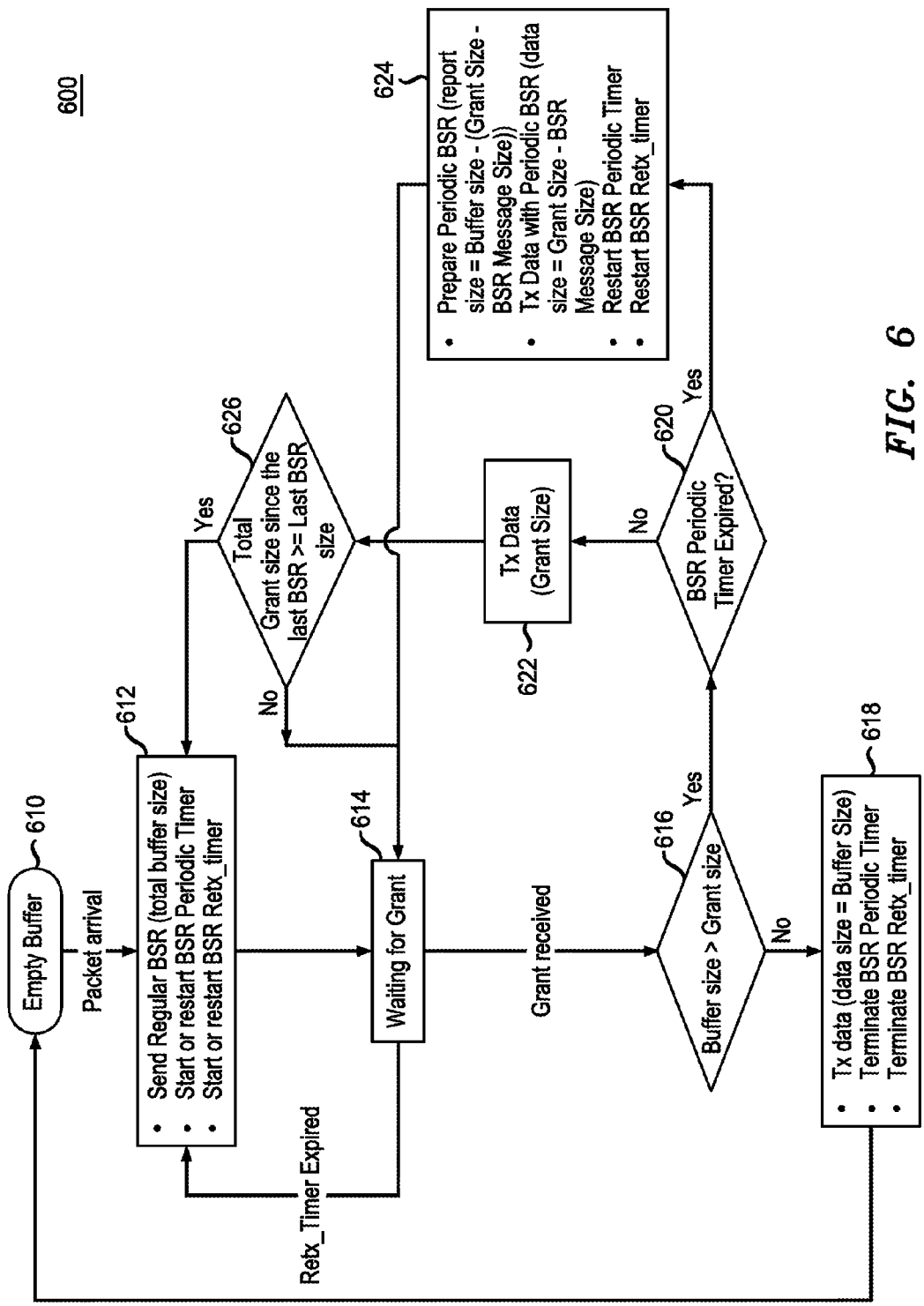
FIG. 6 represents an example flow chart illustrating an enhanced LTE protocol for sending Buffer Status Report (BSR) messages.

FIG. 6 represents an example flowchart illustrating an enhanced protocol 600 for sending Buffer Status Report (BSR) messages from a UE. At step 610, the UE is known to have an empty buffer. An empty buffer indicates that there is no data available for transmission in the UL buffers of the UE. At step 612, after packet arrival from the upper layer (e.g., application layer), the UE sends to an eNB a regular BSR message which indicates the total buffer size, starts the periodic BSR timer and starts the retransmit BSR timer. The UE then proceeds to wait for a grant message at step 614.

While waiting for a grant message, if the retransmit BSR timer expires before receipt of the grant, the UE loops back to step 612 and again sends a regular BSR message and restarts the periodic BSR timer and the retransmit BSR timer. Thus, the enhanced procedure will wait for a grant message for up to a period of time equivalent to the value of the retransmit BSR timer before resending a regular BSR message.

While waiting for a grant message, if the grant is received before the retransmit BSR timer expires, the UE proceeds to step 616 where it is determined whether the buffer size is greater than the grant size. That is; it is determined whether the amount of data available for transmission in the UL buffers of the UE is larger than the grant size.

If the buffer size is not greater than the grant size, at step 618 the UE transmits data with the data size equal to the buffer size, and terminates the periodic BSR timer and the retransmit BSR timer. That is, the UE will transmit all data remaining in the UL buffers and end BSR timing. After these activities, the UE loops back to step 610 at which point the buffer is once again known to be empty.

If the buffer size is greater than the grant size, the UE determines whether the periodic BSR timer has expired at step 620. The value of the periodic BSR timer indicates a period of time to wait between transmissions of BSR messages. If the periodic BSR timer has not expired, the UE prepares to transmit a data message with data size equivalent to the grant size at step 622 and proceeds to step 626 to determine whether the total grant size since the last BSR is greater than or equal to the last BSR size.

If the total grant size since the last BSR is not greater than or equal to the last BSR size then the prepared date message is transmitted and the procees proceeds to step 614 to await another grant of permission to transmit additional portion(s) of the date remaining in the UL buffer at the UE.

If the total grant size since the last BSR is greater than or equal to the last BSR size then the process proceeds to step 612 to send a regular BSR message indicating the buffer size and restart the periodic BSR timer and the retransmit BSR timer. Adjustment in the size of the prepared data message is also made to account for the transmission of a BSR message within this same grant.

Returning to step 620, if the periodic BSR timer has expired, at step 624, the UE prepares a periodic BSR message to report the buffer size as the buffer size minus the difference of the grant size minus the BSR message size, transmits a data message with data equivalent to the grant size minus the BSR message size, and restarts the periodic BSR timer and the retransmit BSR timer. Thus, after receiving a grant that is not larger than the buffer size (i.e., the amount of date available for transmission in the UL bufers of the UE) and expiration of the periodic BSR timer, the illustrated procedure send a periodic BSR message and a portion of the data in the UL buffers of the UE to the eNB. The UE then returns to step 614 to await a grant to be able to transmit additional portion/s of the data remaining in the UL buffers at the UE.

Thus, as soon as the total grant size is equal to or more than the reported buffer size, a UE according to the methodology herein is able to send a regular BSR message without waiting for the retransmit BSR timer to expire. This robust mechanism enables the reduction of congestion in wireless networks and increases the user quality of experience (in particular by reducing application access and jitter) without greatly increasing signaling overhead as comparing to prior solutions for reducing congestion causes by BSR messaging.

Figure 7:
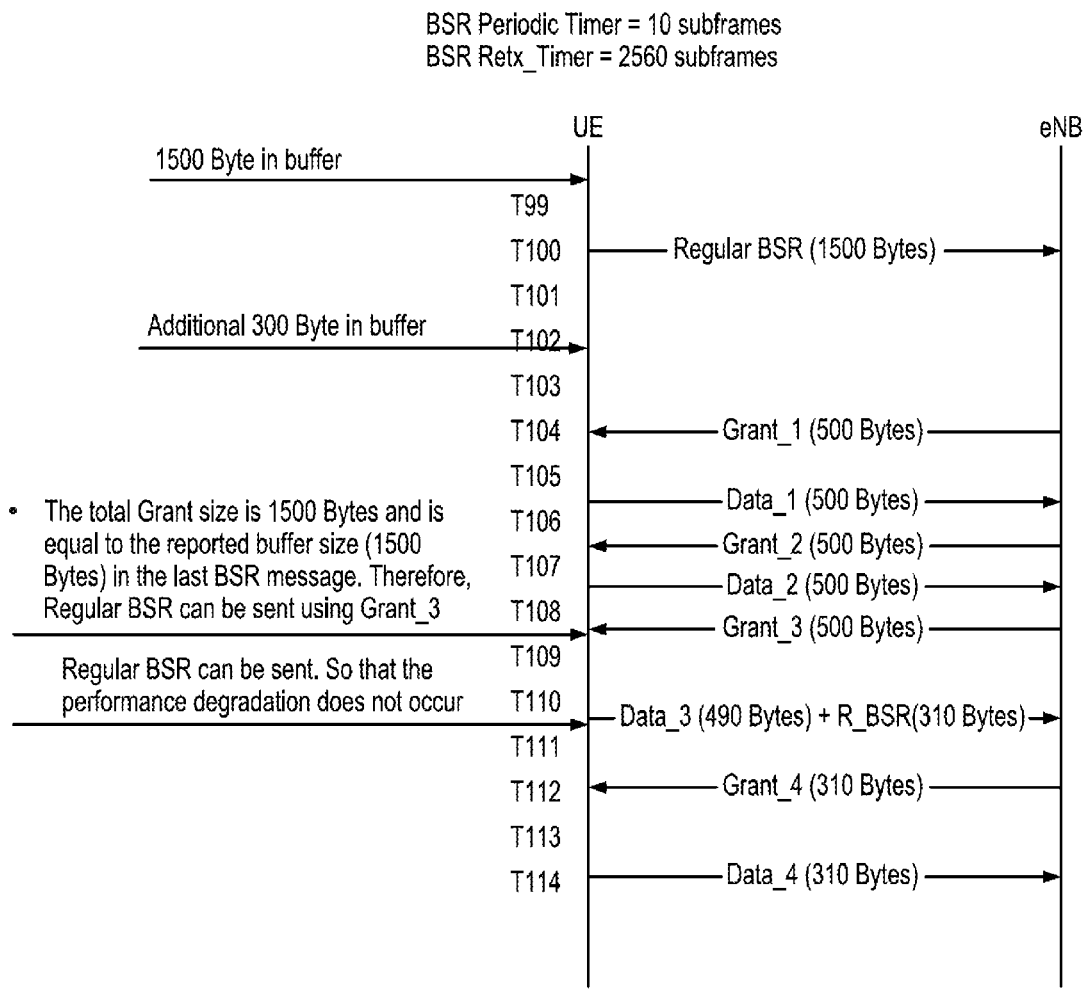
FIG. 7 is an example communication flow illustrating UE-eNB packet transmissions according to the protocol for sending BSR messages detailed in FIG. 6.

FIG. 7 is an example communication flow illustrating UE-eNB packet transmissions according to the enhanced protocol for sending BSR messages detailed in FIG. 6. In the illustrated example of FIG. 6, the periodic BSR timer is set to ten (10) subframes and the retransmit BSR timer is set two-thousand five-hundred sixty (2560) subframes. Time, denoted by times instances numbered T99, T100, . . . T114 runs from the top to bottom of FIG. 7. While both periodic BSR timer and the retransmit BSR timer are utilized, activity associated with the expiration of the retransmit BSR timer is not in action/invoked in the illustrated example At time T99, fifteen hundred (1500) bytes are now in the buffer of the UE. At time T100, a regular BSR message is transmitted from the UE to the eNB. The BSR message is characterized as regular since it is the initial BSR message. The BSR message indicates that there are fifteen hundred (1500) bytes are in the buffer of the UE (i.e., fifteen hundred (1500) bytes available for transmission in the UL buffers of the UE). At time T102, an additional three hundred (300) bytes are placed in the UL buffers of the UE. At time T104, the eNB transmits a first grant message to the UE; the UE receives from the eNB the first grant for five hundred (500) bytes. The buffer size being greater than the grant size and the periodic BSR timer not yet having expired (FIG. 6: 616, 620), at time T106, the UE transmits a first data message of five hundred (500) bytes (FIG. 6: 622). At this point in time, the total grant size since the last BSR (500 bytes) is not greater than or equal to the last BSR size (1500 bytes) so the UE waits for the next grant (FIG. 6: 626, 614).

At time T107, the eNB transmits a second grant to the UE; the UE receives from the eNB the second grant for five hundred (500) bytes. The buffer size being greater than the grant size and the periodic BSR timer not yet having expired (FIG. 6: 616, 620), at time T108, the UE transmits a second data message of five hundred (500) bytes (FIG. 6: 622). At this point, the total grant size since the last BSR (1000 bytes=first grant 500 bytes+second grant 500 bytes) is not greater than or equal to the last BSR size (1500 bytes) so the UE waits for the next grant (FIG. 6: 626, 614).

At time T109, the eNB transmits a third grant to the UE; the UE receives from the eNB the third grant for five hundred (500) bytes.

At this point, the total grant size since the last BSR (1500 bytes) is greater than or equal to the last BSR size (1500 bytes). Therefore, a regular BSR can be sent (FIG. 6: 626, 612).

A regular BSR message can be sent without waiting for the retransmisison timer expiration so that performance degradation is minimized and/or avoided. Adjustment in the size of the prepared data message (FIG. 6: 622) is made to account for the transmission of a BSR message within this same grant. Accordingly, the size of the data message transmitted at T110 is adjusted for the size of the BSR message transmission (Data message=grant size (500 bytes)−BSR message size (10 bytes)=490 bytes) and the BSR message reflects the remaining size of the UL buffers (390 bytes=UL buffer size (800 bytes)−data message size (490 bytes).

At time T112, the eNB transmits a fourth grant to the UE; the UE receives from the eNB the fourth grant for three hundred ten (310) bytes. The buffer size not being greater than the grant size (FIG. 6: 616), at time T114, the UE transmits a fourth data message with a data size equivalent to the grant of three hundred ten (310) bytes (FIG. 6: 618).

Figure 8:
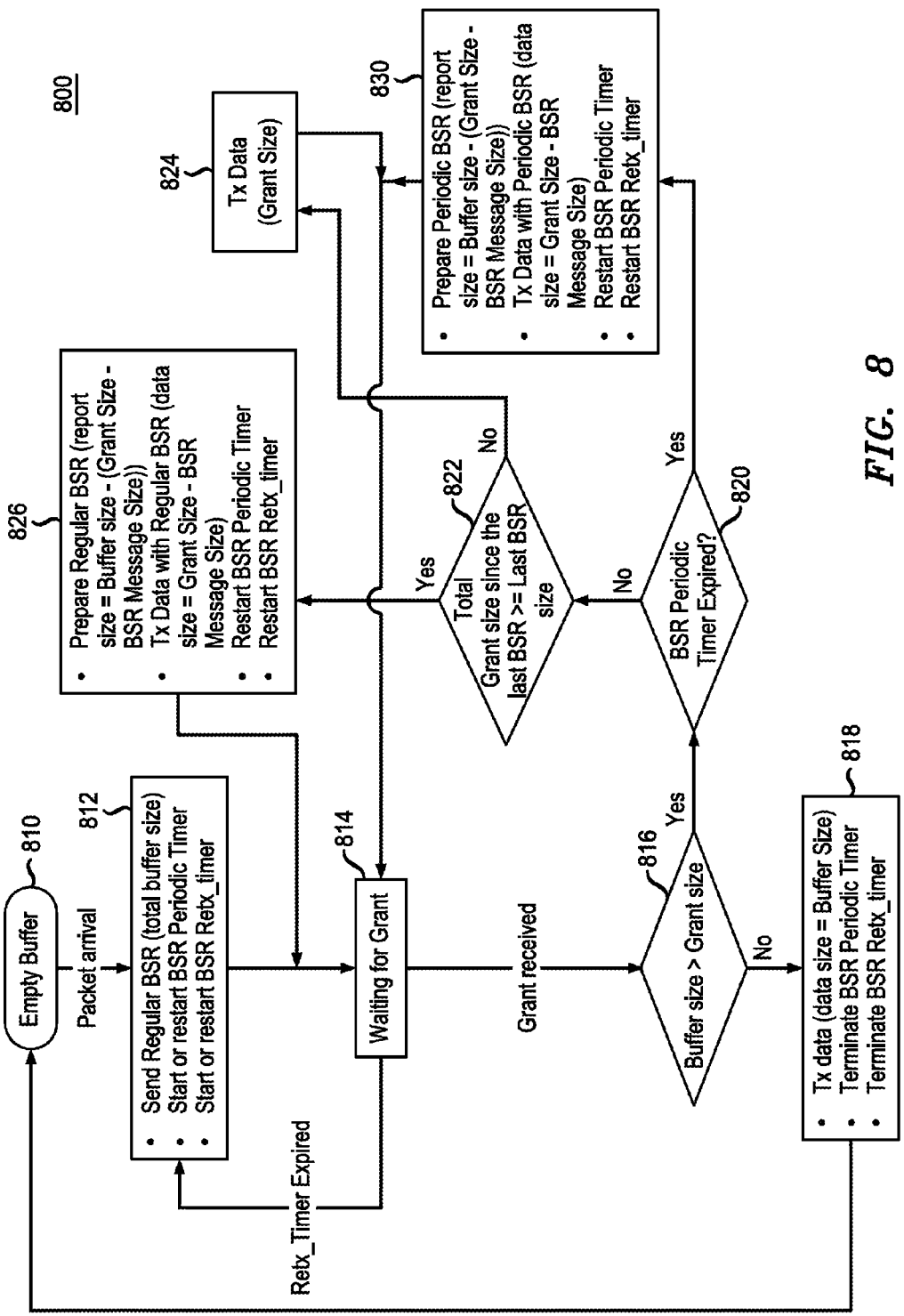
FIG. 8 represents another example flow chart illustrating an enhanced LTE protocol for sending Buffer Status Report (BSR) messages.

FIG. 8 represents an example flowchart illustrating an enhanced protocol 800 for sending Buffer Status Report (BSR) messages from a UE. At step 810, the UE is known to have an empty buffer. An empty buffer indicates that there is no data available for transmission in the UL buffers of the UE. At step 812, after packet arrival from the upper layer (e.g., application layer), the UE sends to an eNB a regular BSR message which indicates the total buffer size, starts the periodic BSR timer and starts the retransmit BSR timer. The UE then waits for a grant message at step 814.

While waiting for a grant message, if the retransmit BSR timer expires before receipt of the grant, the UE loops back to step 812 and again sends a regular BSR message and restarts the periodic BSR timer and the retransmit BSR timer. Thus, the enhanced procedure will wait for a grant message for up to a period of time equivalent to the value of the retransmit BSR timer before resending a regular BSR message.

While waiting for a grant message, if the grant is received before the retransmit BSR timer expires, the UE proceeds to step 816 where it is determined whether the buffer size is greater than the grant size. That is; it is determined whether the amount of data available for transmission in the UL buffers of the UE is larger than the grant size.

If the buffer size is not greater than the grant size, at step 818 the UE transmits data with the data size equal to the buffer size, and terminates the periodic BSR timer and the retransmit BSR timer. That is, the UE will transmit all data remaining in the UL buffers and end BSR timing. After these activities, the UE loops back to step 810 at which point the buffer is once again known to be empty.

If the buffer size is greater than the grant size, the UE determines whether the periodic BSR timer has expired at step 820. The value of the periodic BSR timer indicates a period of time to wait between transmissions of BSR messages. If the periodic BSR timer has not expired, the methodology proceeds to step 822 to determine whether the total grant size since the last BSR is greater than or equal to the last BSR size.

If the total grant size since the last BSR is not greater than or equal to the last BSR size then the UE prepares to transmit a data message with data size equivalent to the grant size at step 824 and proceeds to step 814 to await another grant of permission to transmit additional portions of the date remaining in the UL buffer at the UE.

If the total grant size since the last BSR is greater than or equal to the last BSR size then at step 826 the UE prepares and sends a regular BSR message to report the buffer size as the buffer size minus the difference of the grant size minus the BSR message size, transmits a data message with data equivalent to the grant size minus the BSR message size, and restarts the periodic BSR timer and the retransmit BSR timer. The data message and BSR message utilize the grant. The method then proceeds to step 814 to await a grant to be able to transmit additional portion/s of the data remaining in the UL buffers at the UE.

Returning to step 820, if the periodic BSR timer has expired, at step 824, the UE prepares a periodic BSR message to report the buffer size as the buffer size minus the difference of the grant size minus the BSR message size, transmits a data message with data equivalent to the grant size minus the BSR message size, and restarts the periodic BSR timer and the retransmit BSR timer. Thus, after receiving a grant that is not larger than the buffer size (i.e., the amount of date available for transmission in the UL bufers of the UE) and expiration of the periodic BSR timer, the illustrated procedure transmits/sends a periodic BSR message and a porton of the data in the UL buffers of the UE to the eNB. The UE then returns to step 814 to await a grant to be able to transmit additional portion's of the data remaining in the UL buffers at the UE.

Thus, as soon as the total grant size is equal to or more than the reported buffer size, a UE according to the methodologies herein is able to send a regular BSR message without waiting for the retransmit BSR timer to expire. This robust mechanism enables the reduction of congestion in wireless networks and increases the user quality of experience (in particular by reducing application access and jitter) without greatly increasing signaling overhead as comparing to prior solutions for reducing congestion causes by BSR messaging.

With reference to FIG. 7 in conjunction with the methodology of FIG. 8, at time T99, fifteen hundred (1500) bytes are now in the buffer of the UE. At time T100, a regular BSR message is transmitted from the UE to the eNB. The BSR message is characterized as regular since it is not a periodic message. The BSR message indicates that there are fifteen hundred (1500) bytes are in the buffer of the UE (i.e., fifteen hundred (1500) bytes available for transmission in the UL buffers of the UE). At time T102, an additional three hundred (300) bytes are placed in the UL buffers of the UE. At time T104, the eNB transmits a first grant message to the UE; the UE receives from the eNB the first grant for five hundred (500) bytes. The buffer size being greater than the grant size, the periodic BSR timer not yet having expired, and the total grant size since the last BSR (500 bytes) not being greater than or equal to the last BSR size (1500 bytes) (FIG. 8: 816, 820, 822), at time T106, the UE transmits a first data message of five hundred (500) bytes (FIG. 8: 824) and proceeds to wait for the next grant (FIG. 8: 814).

At time T107, the eNB transmits a second grant to the UE; the UE receives from the eNB the second grant for five hundred (500) bytes. The buffer size being greater than the grant size, the periodic BSR timer not yet having expired, and the total grant size since the last BSR (500 bytes) not being greater than or equal to the last BSR size (1500 bytes) (FIG. 8: 816, 820, 822), at time T108, the UE transmits a second data message of five hundred (500) bytes (FIG. 8: 824) and proceeds to wait for the next grant (FIG. 8: 814). Note that the total grant size since the last BSR (1000 bytes=first grant 500 bytes+second grant 500 bytes) is not greater than or equal to the last BSR size (1500 bytes).

At time T109, the eNB transmits a third grant to the UE; the UE receives from the eNB the third grant for five hundred (500) bytes.

At this point, the buffer size is greater than the grant size and the periodic BSR timer has not yet expired but the total grant size since the last BSR (1500 bytes) is greater than or equal to the last BSR size (1500 bytes). Therefore, a regular BSR can be sent (FIG. 8: 816, 820, 822, 826). The regular BSR message can be sent without waiting for the retransmisison timer expiration so that performance degradation is minimized and/or avoided.

At time T112, the eNB transmits a fourth grant to the UE; the UE receives from the eNB the fourth grant for three hundred ten (310) bytes. The buffer size not being greater than the grant size (FIG. 8: 816), at time T114, the UE transmits a fourth data message with a data size equivalent to the grant of three hundred ten (310) bytes (FIG. 8: 818).

Figure 9:
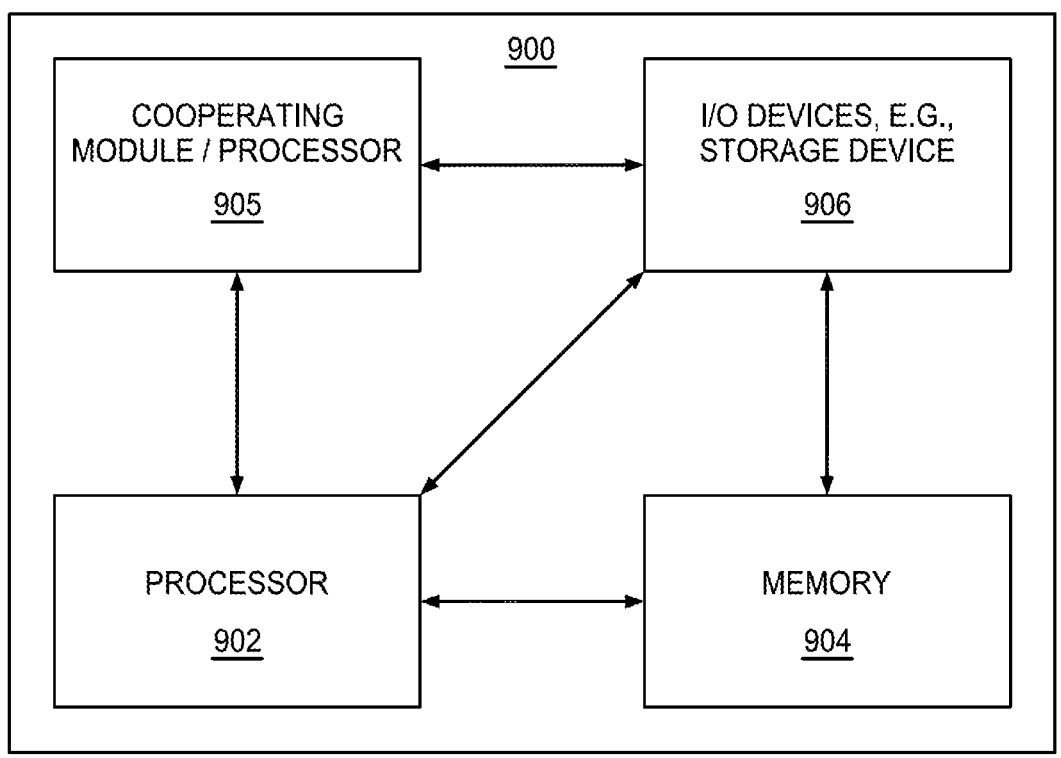
FIG. 9 depicts a high-level block diagram of a computer suitable for use in performing the functions described herein.

FIG. 9 depicts a high-level block diagram of a computer suitable for use in performing functions described herein. In particular, this computer is suitable for implementation as a UE programmed with the methodology of FIG. 6 or 8.

As depicted in FIG. 9, computer 900 includes a processor element 902 (e.g., a central processing unit (CPU) and/or other suitable processor(s)) and a memory 904 (e.g., random access memory (RAM), read only memory (ROM), and the like). The computer 900 also may include a cooperating module/process 905 and/or various input/output devices 906 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software in conjunction with associated hardware (e.g., via implementation of software on one or more processors that access associated memory) and/or hardware (e.g., using a general purpose computer, one or more application specific integrated circuits (ASIC), and/or any other hardware equivalents).

It will be appreciated that the functions depicted and described herein may be implemented in software for executing in conjunction with a general purpose computer (e.g., via execution by one or more processors that access associated memory) so as to implement a special purpose computer, and/or may be implemented in hardware (e.g., using one or more application specific integrated circuits (ASIC) and/or one or more other hardware equivalents).

In one embodiment, the cooperating process 905 can be loaded into memory 904 and executed by processor 902 to implement functions as discussed herein. Thus, cooperating process 905 (including associated data structures) can be stored on a computer readable storage medium, e.g., RAM memory, magnetic or optical drive or diskette, and the like.

It will be appreciated that computer 900 depicted in FIG. 9 provides a general architecture and functionality suitable for implementing functional elements described herein and/or portions of functional elements described herein. For example, the computer 900 provides a general architecture and functionality suitable for implementing one or more of one of the UEs 102, the eNBs 111, the MMEs 114 the SGWs 112 the PGW 113 the PCRF 115 the SGSN 122, and the Management System 160.

It is contemplated that some of the steps discussed herein as processes, procedures, or methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus comprising
a memory device; and
an associated processor, the processor configured to transmit a buffer status report message including a reported buffer size indicating an amount of data available for transmission in an uplink buffer of the apparatus when
the amount of data available for transmission in the uplink buffer is greater than a grant size of a respective grant of one or more grants of uplink resource,
a periodic buffer status report timer has not expired, and
a total grant size of the one or more grants of uplink resource is greater than or equal to the reported buffer size associated with a last transmitted buffer status report message.

2. The apparatus of claim 1 wherein the processor is configured to
store the reported buffer size associated with the last transmitted buffer status report message; and
track the one or more grants of uplink resource.

3. The apparatus of claim 1 wherein the processor is configured to
transmit the last transmitted buffer status report message.

4. The apparatus of claim 1 wherein the processor is configured to
receive the one or more grants of uplink resource in one or more grant messages, the one or more grant messages each indicating a corresponding grant size of uplink resource; and
accumulate the total grant size based on the corresponding grant size of the one or more grant messages.

5. The apparatus of claim 1 wherein the apparatus is a user equipment.

6. The apparatus of claim 1 wherein the processor is configured to
transmit a data message in response to the one or more grants of uplink resource.

7. The apparatus of claim 6 wherein the processor is configured to
adjust a size of the data message to account for transmission of the buffer status report message within a same grant of uplink resource.

8. The apparatus of claim 1 wherein the processor is configured to
transmit another buffer status report message periodically.

9. The apparatus of claim 1 wherein the processor is configured to
transmit another buffer status report message in response to a respective first of the one or more grants of uplink resource after expiry of the periodic buffer status report timer when the amount of data available for transmission in the uplink buffer is greater than a grant size of the respective first grant of the one or more grants.

10. The apparatus of claim 1 wherein the processor is configured to
 transmit the data available for transmission in the uplink buffer when the amount of data available for transmission in the uplink buffer is not greater than the grant size of the respective grant of the one or more grants of uplink resource.

11. The apparatus of claim 1 wherein the processor is configured to
 transmit the buffer status report message including the reported buffer size indicating the amount of data available for transmission in the uplink buffer of the apparatus when
  the amount of data available for transmission in the uplink buffer is greater than the grant size of the respective grant of the one or more grants of uplink resource, and
  the periodic buffer status report timer has expired.

12. The apparatus of claim 1 wherein the processor is configured to
 transmit a portion of the data available for transmission in the uplink buffer when
  the amount of data available for transmission in the uplink buffer is greater than the grant size of the respective grant of the one or more grants of uplink resource,
  the periodic buffer status report timer has not expired, and
  the total grant size of the one or more grants of uplink resource is not greater than or equal to the reported buffer size associated with the last transmitted buffer status report message.

13. A method comprising:
 storing a reported buffer size associated with a last transmitted buffer status report message, the reported buffer size indicating an amount of data available for transmission in an uplink buffer of an apparatus;
 tracking one or more grants of uplink resource to the apparatus; and
 transmitting from the apparatus a buffer status report message when
  a current amount of data available for transmission in the uplink buffer is greater than a grant size of a respective grant of one or more grants of uplink resource,
  a periodic buffer status report timer has not expired, and
  a total grant size of the one or more grants of uplink resource is greater than or equal to the reported buffer size associated with the last transmitted buffer status report message.

14. The method of claim 13 further comprising:
 transmitting the last transmitted buffer status report message.

15. The method of claim 13 wherein tracking one or more grants of uplink resource comprises:
 receiving one or more grant messages, the one or more grant messages each indicating a corresponding grant size of the respective grant of the uplink resource; and
 accumulating a total grant size based on the corresponding grant size of the one or more grant messages.

16. The method of claim 13 wherein the method is performed by a user equipment.

17. The method of claim 13 further comprising:
 transmitting a data message in response to the one or more grants of uplink resource.

18. The method of claim 17 wherein transmitting the data message comprises:
 transmitting the data message with a size of the data message adjusted to account for the transmitting of the buffer status report message within a same grant of uplink resource.

19. The method of claim 13 further comprising:
 transmitting another buffer status report message in response to the respective grant of the one or more grants of uplink resource after expiry of a periodic buffer status report timer when the amount of data available for transmission in the uplink buffer is greater than the grant size of the respective grant of the one or more grants of uplink resource.

20. The method of claim 13 further comprising:
 transmitting the data available for transmission in the uplink buffer when the amount of data available for transmission in the uplink buffer is not greater than the grant size of the respective grant of the one or more grants of uplink resource.

* * * * *